United States Patent
Mallik et al.

(10) Patent No.: US 11,604,946 B2
(45) Date of Patent: Mar. 14, 2023

(54) VISUAL BEHAVIOR GUIDED OBJECT DETECTION

(71) Applicant: Ford Global Technologies, LLC, Dearborn, MI (US)

(72) Inventors: Apurbaa Mallik, Sunnyvale, CA (US); Vijay Nagasamy, Fremont, CA (US); Aniruddh Ravindran, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/867,690

(22) Filed: May 6, 2020

(65) Prior Publication Data

US 2021/0350184 A1 Nov. 11, 2021

(51) Int. Cl.
*G06K 9/00* (2022.01)
*G06K 9/62* (2022.01)
(Continued)

(52) U.S. Cl.
CPC ......... *G06K 9/6262* (2013.01); *B60W 60/001* (2020.02); *G05D 1/0088* (2013.01);
(Continued)

(58) Field of Classification Search
CPC ............ G06K 9/6262; G06K 9/00711; G06K 9/6267; G06K 9/00832; G06K 9/46; G06K 9/0061; G05D 1/0088; G05D 1/0221; G05D 2201/0213; B60W 60/001; B60W 2540/225; G06N 3/08; G06F 3/013
See application file for complete search history.

(56) References Cited

U.S. PATENT DOCUMENTS

| 7,924,146 B2 | 4/2011 | Seder et al. |
| 2016/0173865 A1* | 6/2016 | Park ........................ G01C 21/20 348/118 |

(Continued)

FOREIGN PATENT DOCUMENTS

| CN | 103455795 B | 12/2013 |
| DE | 102011084367 A1 | 4/2013 |

OTHER PUBLICATIONS

Final Office Action for U.S. Appl. No. 16/773,339 as issued by the USPTO dated Aug. 9, 2022.

(Continued)

*Primary Examiner* — Nancy Bitar
*Assistant Examiner* — Xiao Liu
(74) *Attorney, Agent, or Firm* — Frank A. MacKenzie; Bejin Bieneman PLC (57) ABSTRACT

A training system for a deep neural network and method of training is disclosed. The system and/or method may comprise: receiving, from an eye-tracking system associated with a sensor, an image frame captured while an operator is controlling a vehicle; receiving, from the eye-tracking system, eyeball gaze data corresponding to the image frame; and iteratively training the deep neural network to determine an object of interest depicted within the image frame based on the eyeball gaze data. The deep neural network generates at least one feature map and determine a proposed region corresponding to the object of interest within the at least one feature map based on the eyeball gaze data.

18 Claims, 6 Drawing Sheets

(51) Int. Cl.
*G06F 3/01* (2006.01)
*G05D 1/00* (2006.01)
*G05D 1/02* (2020.01)
*B60W 60/00* (2020.01)
*G06N 3/08* (2023.01)
*G06V 10/40* (2022.01)
*G06V 20/40* (2022.01)
*G06V 20/59* (2022.01)
*G06V 40/18* (2022.01)

(52) U.S. Cl.
CPC ........... *G05D 1/0221* (2013.01); *G06F 3/013* (2013.01); *G06K 9/6267* (2013.01); *G06N 3/08* (2013.01); *G06V 10/40* (2022.01); *G06V 20/40* (2022.01); *G06V 20/59* (2022.01); *G06V 40/193* (2022.01); *B60W 2540/225* (2020.02); *G05D 2201/0213* (2013.01)

(56) References Cited

U.S. PATENT DOCUMENTS

| | | | |
|---|---|---|---|
| 2017/0031363 A1 | 2/2017 | Laur et al. | |
| 2018/0096457 A1* | 4/2018 | Savvides | G06F 16/50 |
| 2018/0137642 A1* | 5/2018 | Malisiewicz | G06T 7/11 |
| 2018/0225554 A1 | 8/2018 | Tawari et al. | |
| 2019/0246036 A1* | 8/2019 | Wu | B60R 11/04 |
| 2019/0265712 A1* | 8/2019 | Satzoda | G08G 1/0133 |
| 2019/0346844 A1 | 11/2019 | Chen et al. | |
| 2019/0374151 A1 | 12/2019 | Paudel et al. | |
| 2020/0125093 A1 | 4/2020 | Sham | |
| 2020/0364453 A1* | 11/2020 | Tonsen | G06T 7/73 |
| 2021/0056306 A1 | 2/2021 | Hu et al. | |
| 2021/0088784 A1* | 3/2021 | Whitmire | G02B 27/017 |
| 2021/0232812 A1* | 7/2021 | Jaipuria | G06N 3/08 |
| 2022/0083134 A1* | 3/2022 | Kassner | G06F 13/382 |

OTHER PUBLICATIONS

Du, X. et al., "Fused Deep Neural Networks for Efficient Pedestrian Detection," May 2, 2018, 11 pages.

Non-Final Office Action for related U.S. Appl. No. 16/773,339, as issued by the USPTO dated Apr. 6, 2022.

Palazzi, A., et al., "Predicting the Driver's Focus of Attention: the DR(eye)VE Project," University of Modena, Deparlment of Engineering, Jun. 6, 2018, 25 pages.

* cited by examiner

VISUAL BEHAVIOR GUIDED OBJECT DETECTION

BACKGROUND

Autonomous vehicles can execute computer-controlled steering and speed-control based on sensor input. In some instances, autonomous vehicles may use deep neural networks (DNNs) to perform many image understanding tasks, including classification, segmentation, and captioning. For example, deep neural networks can take an image as input, assign an importance to various aspects/objects depicted within the image, and differentiate the aspects/objects from one another.

DETAILED DESCRIPTION

A method of training a deep neural network can include: receiving, from an eye-tracking system associated with a sensor, an image frame captured while an operator is controlling a vehicle; receiving, from the eye-tracking system, eyeball gaze data corresponding to the image frame; and iteratively training the deep neural network to determine an object of interest depicted within the image frame based on the eyeball gaze data. The deep neural network generates at least one feature map and determine a proposed region corresponding to the object of interest within the at least one feature map based on the eyeball gaze data.

In other features, the eye-tracking system is a wearable eye-tracking system and is worn by the operator while the image frame is captured by the sensor.

In other features, the deep neural network comprises a convolutional neural network (CNN), wherein an input to the CNN is the image frame, wherein an output of the CNN comprises the at least one feature map.

In other features, the deep neural network comprises a region proposal network that receives the at least one feature map and projected eye coordinates corresponding to the eyeball gaze data, wherein the region proposal network determines the proposed region based on the projected eye coordinates.

In other features, the deep neural network comprises a region of interest pooling layer that receives the at least one feature map and the proposed region, wherein the region of interest pooling layer modifies the at least one feature map such that a size of modified feature map equals a predetermined size.

In other features, the deep neural network comprises at least one fully connected layer that receives the modified feature map, wherein the at least one fully connected layer classifies the object of interest.

In other features, the image frame is one of a plurality of video frames received from the sensor.

In other features, the eye-tracking system comprises the sensor, one or more illuminators directed toward the operator's eyes, one or more cameras directed toward the operator's eyes, and a computer programmed to use the eyeball gaze data and the image frame to determine a gaze point of the operator, wherein the sensor comprises a red-green-blue (RGB) camera.

In other features, the method includes installing the trained deep neural network in a vehicle; and using the trained deep neural network to navigate the vehicle in an autonomous mode.

In other features, the eyeball gaze data comprises one or more of the following information: a timestamp (of the image frame), a left eye gaze point, a right eye gaze point, a left eye three-dimensional (3D) gaze position, a right eye 3D gaze position, a combined-eye 3D gaze position, a left eye pupil position, a right eye pupil position, a left eye pupil diameter, a right eye pupil diameter, a left eye confidence parameter, a right eye confidence parameter, a galvanic skin response parameter, a tri-axis accelerometer value, a tri-axis gyroscopic value, or a mapped gaze point.

According to at least one additional illustrative example, a system is described that comprises: an eye-tracking system including a sensor; a computer communicatively coupled to the sensor and the eye-tracking system, the computer comprising one or more processors and memory storing instructions executable by the one or more processors, wherein the instructions, when executed by the processor, cause the processor to: receive, from the eye-tracking system, an image frame captured while an operator is controlling a vehicle; receive, from the eye-tracking system, eyeball gaze data corresponding to the image frame; and iteratively train a deep neural network to determine an object of interest depicted within the image frame based on the eyeball gaze data. The deep neural network generates at least one feature map and determine a proposed region corresponding to the object of interest within the at least one feature map based on the eyeball gaze data.

According to the at least one example set forth above, the deep neural network comprises a pedestrian detection algorithm, a first deep neural network (first DNN), a second deep neural network (second DNN), and a third deep neural network (third DNN), wherein an input to each of the pedestrian detection algorithm and the second DNN is the image frame, wherein an output of the first and second DNNs are inputs to the third DNN, wherein an output of the third DNN is an indication of the one or more target pedestrians.

According to the at least one example set forth above, a computing device comprising at least one processor and memory is disclosed that is programmed to execute any combination of the examples of the method(s) set forth above.

According to the at least one example, a computer program product is disclosed that includes a computer readable medium that stores instructions which are executable by a computer processor, wherein the instructions of the computer program product include any combination of the examples of the method(s) set forth above and/or any combination of the instructions executable by the one or more processors, as set forth above and herein.

In other features, the eye-tracking system is a wearable eye-tracking system and is worn by the operator while the image frame is captured by the sensor.

In other features, the deep neural network comprises a convolutional neural network (CNN), wherein an input to the CNN is the image frame, wherein an output of the CNN comprises the at least one feature map.

In other features, the deep neural network comprises a region proposal network that receives the at least one feature map and projected eye coordinates corresponding to the eyeball gaze data, wherein the region proposal network determines the proposed region based on the projected eye coordinates.

In other features, the deep neural network comprises a region of interest pooling layer that receives the at least one feature map and the proposed region, wherein the region of interest pooling layer modifies the at least one feature map such that a size of modified feature map equals a predetermined size.

In other features, the deep neural network comprises at least one fully connected layer that receives the modified feature map, wherein the at least one fully connected layer classifies the object of interest.

In other features, the image frame is one of a plurality of video frames received from the sensor.

In other features, the eye-tracking system comprises the sensor, one or more illuminators directed toward the operator's eyes, one or more cameras directed toward the operator's eyes, and a computer programmed to use the eyeball gaze data and the image frame to determine a gaze point of the operator, wherein the sensor comprises a red-green-blue (RGB) camera.

In other features, the instructions, when executed by the processor, cause the processor to: navigate the vehicle in an autonomous mode based on the object of interest.

In other features, the eyeball gaze data comprises one or more of the following information: a timestamp (of the image frame), a left eye gaze point, a right eye gaze point, a left eye three-dimensional (3D) gaze position, a right eye 3D gaze position, a combined-eye 3D gaze position, a left eye pupil position, a right eye pupil position, a left eye pupil diameter, a right eye pupil diameter, a left eye confidence parameter, a right eye confidence parameter, a galvanic skin response parameter, a tri-axis accelerometer value, a tri-axis gyroscopic value, or a mapped gaze point.

The present disclosure discloses a system that provides driver priority-based object detection and classification. In one or more examples, the system can include a deep neural network. The deep neural network may include a Faster R-CNN (convolutional neural network). The deep neural network can receive a sequence of images captured by an eye-tracking system. The eye-tracking system can capture the sequence of images and determine a user's eyeball gaze data. Using the eyeball gaze data and the sequence of images, the deep neural network generates region proposals corresponding to the eyeball gaze data. As a result, the deep neural network can reduce the number of region proposals generated by typical Faster R-CNN systems.

Turning now to the figures, wherein like reference numerals indicate like or similar features and/or functions, a training system 10 that includes a deep neural network and technique for using the training system 10 is disclosed. Once trained, the deep neural network may be installed into a vehicle 12 allowing the vehicle 12 to navigate in an autonomous mode. More particularly, the deep neural network may be trained to detect and classify objects of interest. For example, the deep neural network may mimic human visual behavior to provide an emphasis on objects that would more likely receive a human driver's attention. These objects can include, but are not limited to, traffic signs, pedestrians and/or bikes crossing the road, cars within a certain vicinity, and/or signboards within a certain distance. The trained deep neural network uses only image data such that the deep neural network is relatively computationally inexpensive with respect to systems that use image data in conjunction with an array of sensors, e.g., LIDAR, radar, etc.

Neural networks may be trained by selecting certain features to teach the neural network to behave in a desired way. However, as discussed herein, training the deep neural network of system 10 (via supervised learning) is improved by using data derived from an experienced human driver/operator. Training the deep neural network includes using an eye-tracking system 14 that determines the operator's eyeball gaze data while the operator controls vehicle 12. More particularly, the output of the eye-tracking system 14 includes the operator's eyeball movements and position correlated to a number of features in a captured image; and some of these features, when appropriate, will include objects within the operator's field of view. Thus, when training the deep neural network, the eyeball gaze data is presumed to be a better identification of relevant features than a programmer selecting certain features—as what the operator views or what catches the operator's attention during operator-driving tends to have greater influence on operator behavior and operator decision-making. In addition, using this training technique improves the computational efficiency in training the deep neural network.

Once trained, the deep neural network may be installed on numerous vehicle computers and can be used to navigate the respective vehicles in scenarios with pedestrians. Further, once installed to an onboard computer, the trained deep neural network increases the computational efficiency regarding navigation. For example, operating in an autonomous mode typically requires pedestrian tracking—i.e., predicting the trajectories of all pedestrians in a scene. However, this can be computationally intensive. Utilizing the trained deep neural network described herein, a subset of pedestrians (referred to herein as target pedestrians) and/or target objects—and trajectories for only that subset of pedestrians may be determined. Thus, using the trained deep neural network streamlines the efficiency of such onboard calculations.

Figure 1:
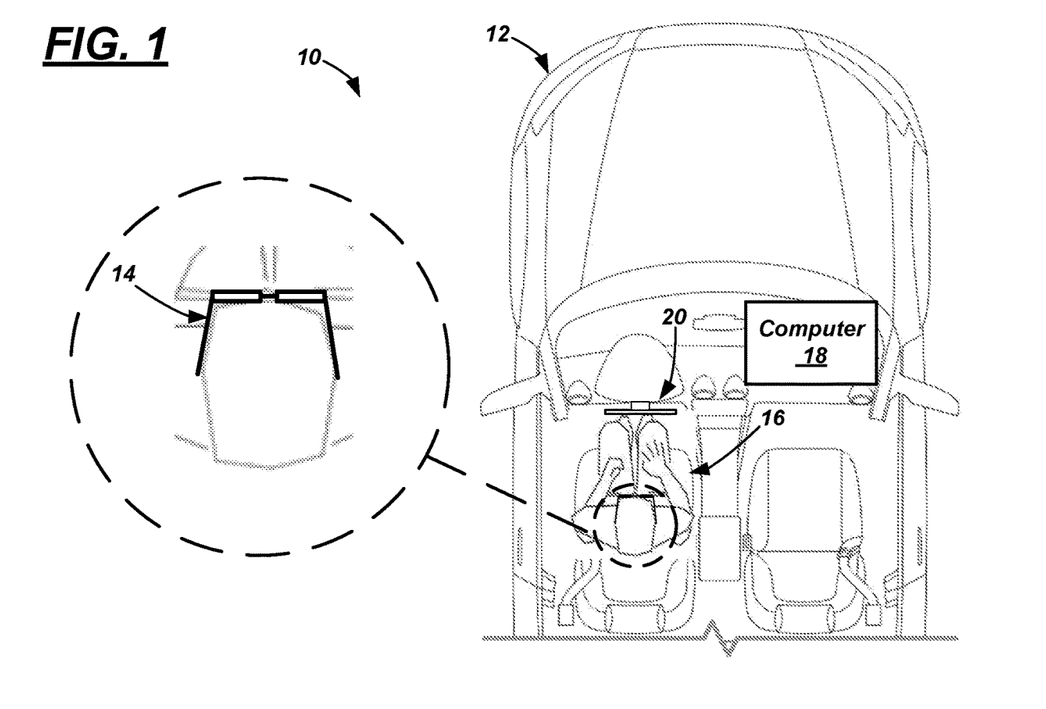
FIG. 1 is a schematic diagram of a system for a deep neural network that includes a vehicle (only a portion of which is shown), an example eye-tracking system, and a computer.
Figure 2:
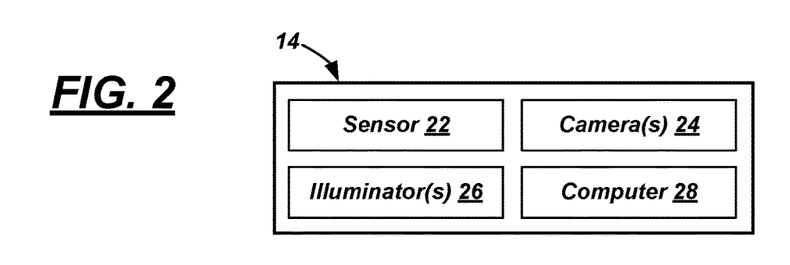
FIG. 2 is an exemplary schematic diagram of the eye-tracking system.
Figure 3:
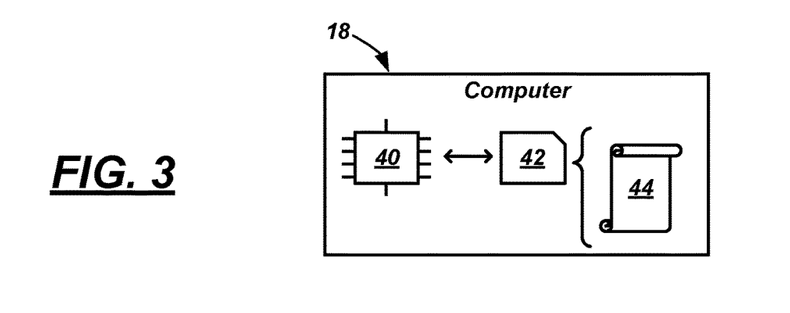
FIG. 3 is an exemplary schematic diagram of the computer.

FIGS. 1 through 3 illustrate the training system 10 which may comprise vehicle 12, eye-tracking system 14 (e.g., which may be worn by human operator in a driver's seat 16 of vehicle 12), and a computer 18 which utilizes a deep neural network.

In FIG. 1, the illustrated vehicle 12 is a passenger vehicle; however, this is merely one example. Vehicle 12 instead could be a truck, a sports utility vehicle (SUV), a recreational vehicle, a bus, a marine vehicle, an aircraft, or any other suitable vehicle that comprises a driver control interface 20 (e.g., such as a steering wheel, accelerator control, braking control, etc.). Vehicle 12 may be configured to operate in any suitable partially autonomous or fully autonomous mode (e.g., including navigation without human interaction).

As shown in FIGS. 1 and 2, eye-tracking system 14 may comprise any device or apparatus that monitors eyeball gaze data of the operator and repeatedly determines a gaze point (e.g., where the operator is looking) that corresponds with a captured image. In some examples, the eye-tracking system 14 comprises a forward-looking sensor 22 (e.g., such as a red-green-blue (RGB) camera) that concurrently captures video representative of the operator's field of view (FOV), multiple eye-monitoring cameras 24, multiple illuminators 26 directed toward the operator's eyes, and a computer 28 configured to determine repeatedly eyeball gaze data of the operator for a plurality of image frames of video data from the sensor 22. The eye-tracking system 14 may be a so-called wearable eye-tracking system or it may be a system mounted in the vehicle 12. A non-limiting commercial implementation of the eye-tracking system 14 is the "Pro Glasses 2" by Tobii AB which comprise an eyeglasses frame, lenses, and the hardware discussed above. In other examples, the sensor 22 and/or computer 28 may not be part of a common assembly with the camera(s) 24 and illuminator(s) 26—e.g., the sensor 22 could be mounted elsewhere in the vehicle 12 or the like.

Non-limiting examples of eyeball gaze data include sets of information for each frame(i) of video; e.g., wherein i is an integer value (e.g., i=0 to N), wherein N is the total quantity of frames of video. Each set of information may comprise one or more of the following illustrative eyeball gaze data criteria: a timestamp (of the frame), a left eye gaze point (e.g., an (x, y) value within the frame(i), a right eye gaze point (e.g., an (x, y) value within the frame(i), a left eye three-dimensional (3D) gaze position (e.g., an (x, y, z) value with respect to the field of view of the operator, a right eye 3D gaze position (e.g., an (x, y, z) value with respect to the field of view of the operator, a combined-eye 3D gaze position (e.g., both left and right eyes), a left eye pupil position, a right eye pupil position, a left eye pupil diameter, a right eye pupil diameter, a left eye confidence parameter (e.g., indicating an accuracy probability relative to the aforementioned criteria), a right eye confidence parameter (e.g., indicating an accuracy probability relative to the aforementioned criteria), a galvanic skin response (GSR) parameter, a tri-axis accelerometer value (e.g., indicating translational forces according to a three-space frame of reference), a tri-axis gyroscopic value (e.g., indicating pitch, roll, and yaw forces according to the same frame of reference), and a mapped gaze point (namely, a correlation of the right and left gaze point values and the right, left, and combined-eye 3D gaze positions with the frame(i)). Additional examples of criteria may be combined in part with the above example criteria or wholly combined. Thus, it should be appreciated that the camera(s) 24 and illuminator(s) 26 may be directed toward the operator's right and left eyes, and computer 28 uses this information (along with sensor data from sensor 22) to calculate the above criteria.

Computer 18 (FIGS. 1 and 3) may comprise one or more processors 40 (only one is shown in the diagram for purposes of illustration), memory 42, and a plurality of instructions 44 (by way of example only, software code) that is stored on memory 42 and is executable by processor(s) 40. Processor(s) 40 may be programmed to process and/or execute digital instructions to carry out at least some of the tasks described herein. Non-limiting examples of processor(s) 40 include one or more of a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. In at least one example, processor(s) 40 read from memory 42 and execute multiple sets of instructions (e.g., including instructions 44) which may be embodied as a computer program product stored on a non-transitory computer-readable storage medium (e.g., such as memory 42). Non-limiting examples of instructions 44 will be described below in the processes illustrated using flow diagrams and described elsewhere herein, wherein these and other instructions may be executed in any suitable sequence unless otherwise stated. The instructions and the example processes described below are merely embodiments and are not intended to be limiting.

Memory 42 may include any non-transitory computer usable or readable medium, which may include one or more storage devices or storage articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 42 may store one or more sets of instructions (e.g., such as instructions 44) which may be embodied as software, firmware, or other programming instructions executable by the processor(s) 40—including but not limited to the instruction examples set forth herein. In operation, processor(s) 40 may read data from and/or write data to memory 42.

Figure 4:
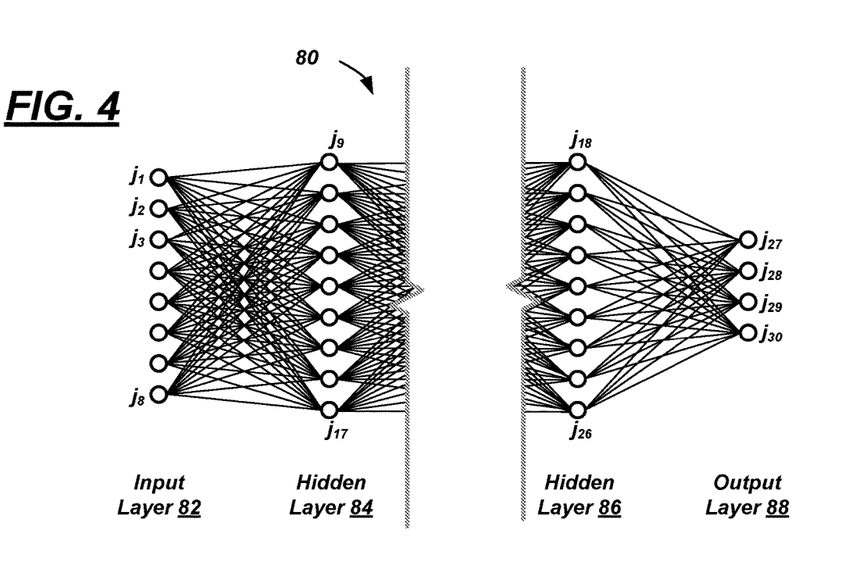
FIG. 4 is a schematic diagram illustrating an example of a deep neural network.

The instructions 44 (stored in memory 42 and executable by processor(s) 40) may comprise any suitable set of instructions for carrying out the methods described herein. As described more fully below, the instructions 44 may comprise a deep neural network 80. As shown, the deep neural network 80 includes an input layer 82, one or more hidden layers 84, 86 (two are shown by way of example, however, any suitable quantity of layers may be used), and an output layer 88, wherein each layer comprises a plurality of neurons (j) (also referred to as 'nodes;' each neuron having a unique index j. In a fully connected neural network, each neuron of a given layer is connected to each of the neurons in a subsequent layer (as shown). Thirty neurons are shown in FIG. 4; however, this is merely an example quantity; the layers 82-88 respectively may have any suitable quantities of neurons.

Sets of inputs to the input layer 82 may comprise an input image generated by forward-looking sensor 22. With regard to other layers (e.g., layers 84-88), sets of inputs to each neuron can be represented by the connections from a previous layer. For example, in the diagram, each of neurons $j_1$-$j_8$ (of layer 82) provide an input to $j_9$ (of layer 84), and each of these inputs may be multiplied by a respective weight. In some examples, the weighted inputs may be summed according to an input function to yield a net input (which may or may not be adjusted according to a respective bias value). In some examples, the respective net input may be provided to a predetermined neural network function (e.g., such as an activation function or the like) which in turn provides an output. This can be repeated similarly for each neuron of the respective layer. As illustrated, the output of a respective neuron may be an input to a plurality of neurons in a subsequent layer or comprise the output layer 88.

Figure 5:
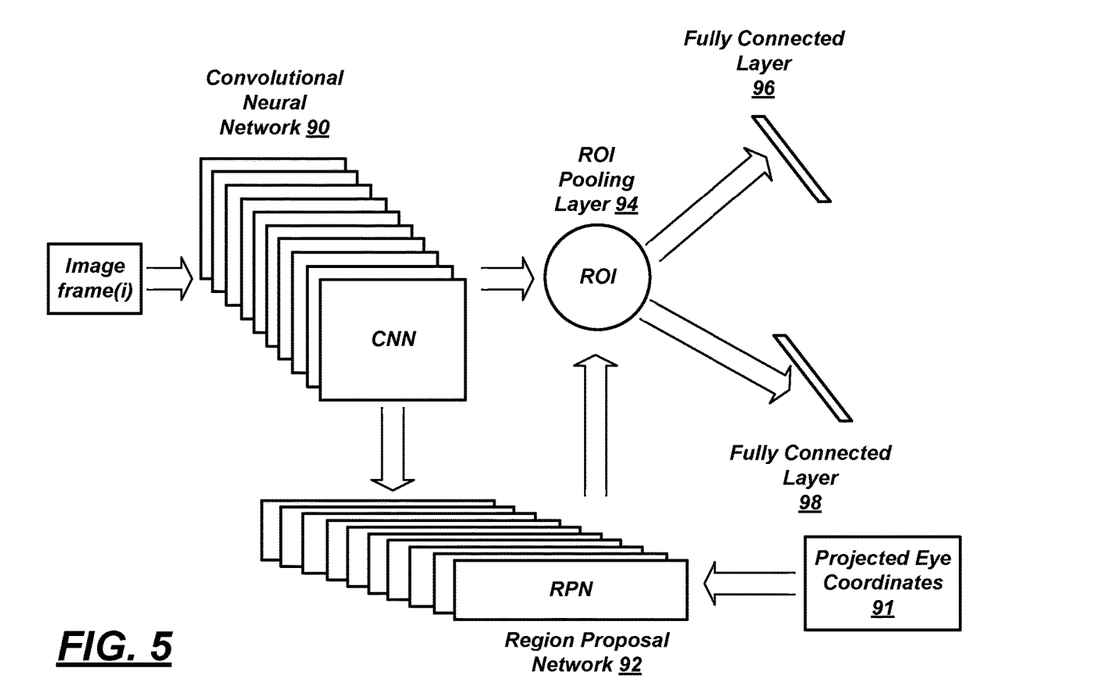
FIG. 5 is a schematic diagram illustrating an example of a deep neural network (DNN) of the deep neural network.

FIG. 5 illustrates an example implementation of the deep neural network 80. The deep neural network 80 may include convolutional neural network (CNN) adapted to extract feature maps(i) based on each image frame(i). According to one non-limiting example, the deep neural network 80 can include a convolutional neural network 90, a region proposal network (RPN) 92, a region-of-interest (ROI) pooling layer 94, a first fully connected layer 96, and a second fully connected layer 98. The convolutional layer 90 may receive the image frame(i) from the eye-tracking system 14 and convolve the image frame(i) using a kernel or filter—e.g., yielding a plurality of convolved features, e.g., feature maps. The feature maps can include one or more anchors throughout the feature map for proposal generation. The anchors may be fixed bounding boxes placed throughout the feature map for one or more points within the feature map and may correspond to each pixel initially. Typically (although not required), there may exist multiple iterations of convolution. Other aspects and convolution techniques may be employed as well.

The feature maps are provided to the RPN 92 for region proposal generation. As shown, the RPN 92 also receives projected eye coordinates 91. The projected eye coordinates 91 may comprise eye gaze position data generated by the eye-tracking system 14. For example, the projected eye coordinates 91 may correspond coordinates, e.g., x and y values, based on the image frame(i). In one or more implementations, the projected eye coordinates 91 are mapped using a suitable mapping function from visual coordinates to feature map coordinates. The RPN 92 generates region proposals based on the anchors and the projected eye coordinates. For example, the RPN 92 generates region proposals about, or proximate to, the projected eye coordinates 91 instead of transitioning a sliding window over the entire feature map. The RPN 92 generates region proposals, such as bounding boxes, to indicate that a subset of pixels may include an object of interest for classification purposes.

The proposed regions and the feature maps are provided to the ROI pooling layer 94. In various implementations, the proposed regions may be different sizes, which can result in different sized feature maps. The ROI pooling layer 94 is configured to modify the feature maps to the same size. The ROI pooling layer 94 may also modify the proposed regions based on the feature map modifications. The modified feature maps can be provided to the first fully connected layer 96 for classification and the second fully connected layer 98 for bounding box regression. For example, the first fully connected layer 96 may generate a prediction indicative of the type of object within the proposed region(s), and the second fully connected layer 98 may comprise a regressor to minimize errors associated with the proposed regions. For example, the second fully connected layer 98 can attempt to minimize the loss between the proposed region and ground truth boxes.

During training, ground truth boxes can be provided to the deep neural network 80 for updating one or more weights within the deep neural network 80. For example, during training, the proposed regions may be compared with the ground truth boxes to determine a loss function. Using the loss function, the deep neural network 80 may update one more weights via backpropagation.

Figure 6:
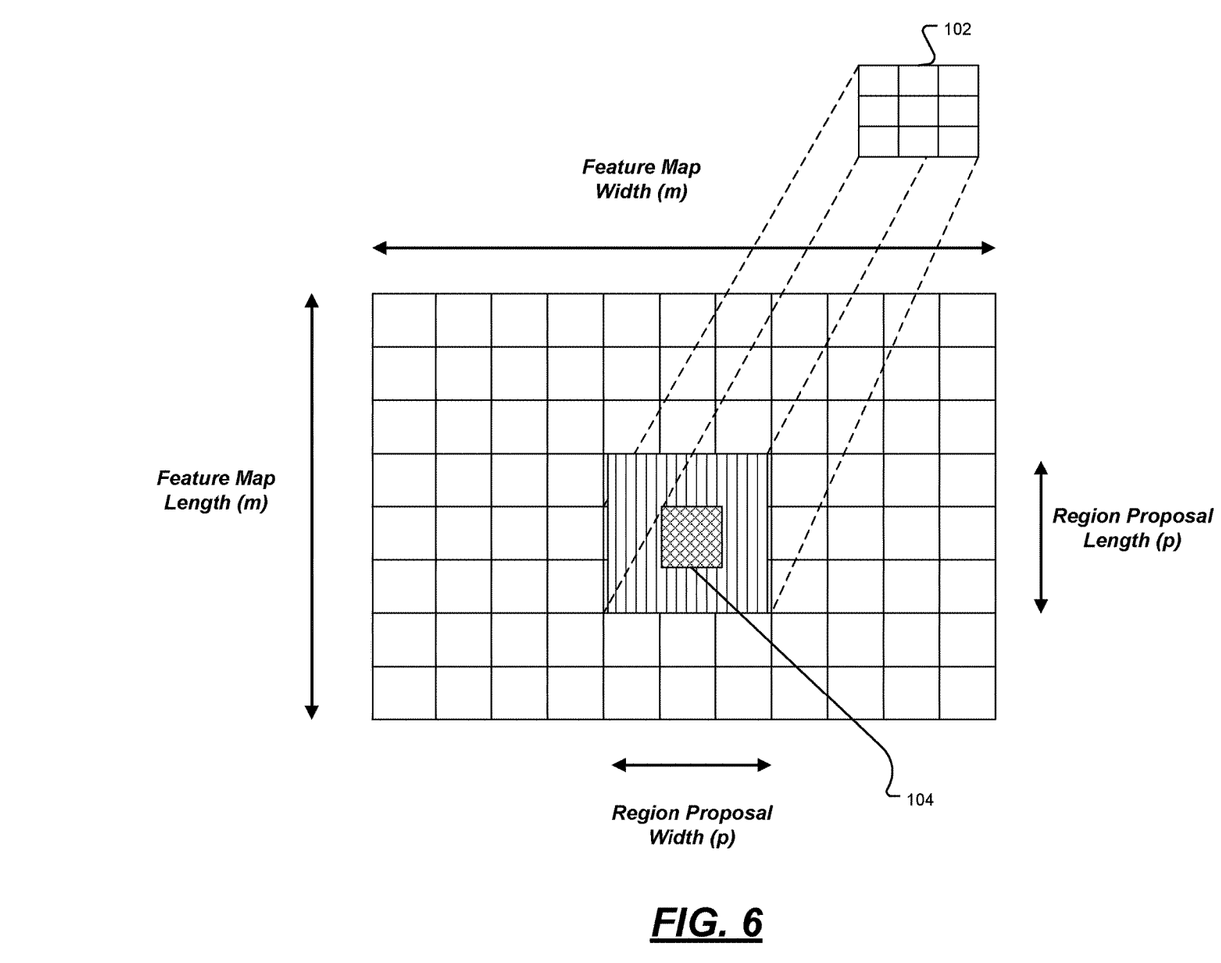
FIG. 6 is a diagram of an example feature map generated by the deep neural network.

FIG. 6 illustrates an example feature map 100 generated by the deep neural network 80. As shown, the size of the feature map 100 is m×m, where m is an integer greater than or equal to 1. The RPN 92 receives the feature map 100 from the deep neural network 80 and the projected eye coordinates 91 and positions a sliding window 102 about the projected eye coordinates 104. In an example implementation, the size of the sliding window 102 is p×p, where p is an integer greater than or equal to 1 and less than m. In this example, the sliding window 102 may be centered about the projected eye coordinates to generate region proposals within the feature map 100.

Figure 7:
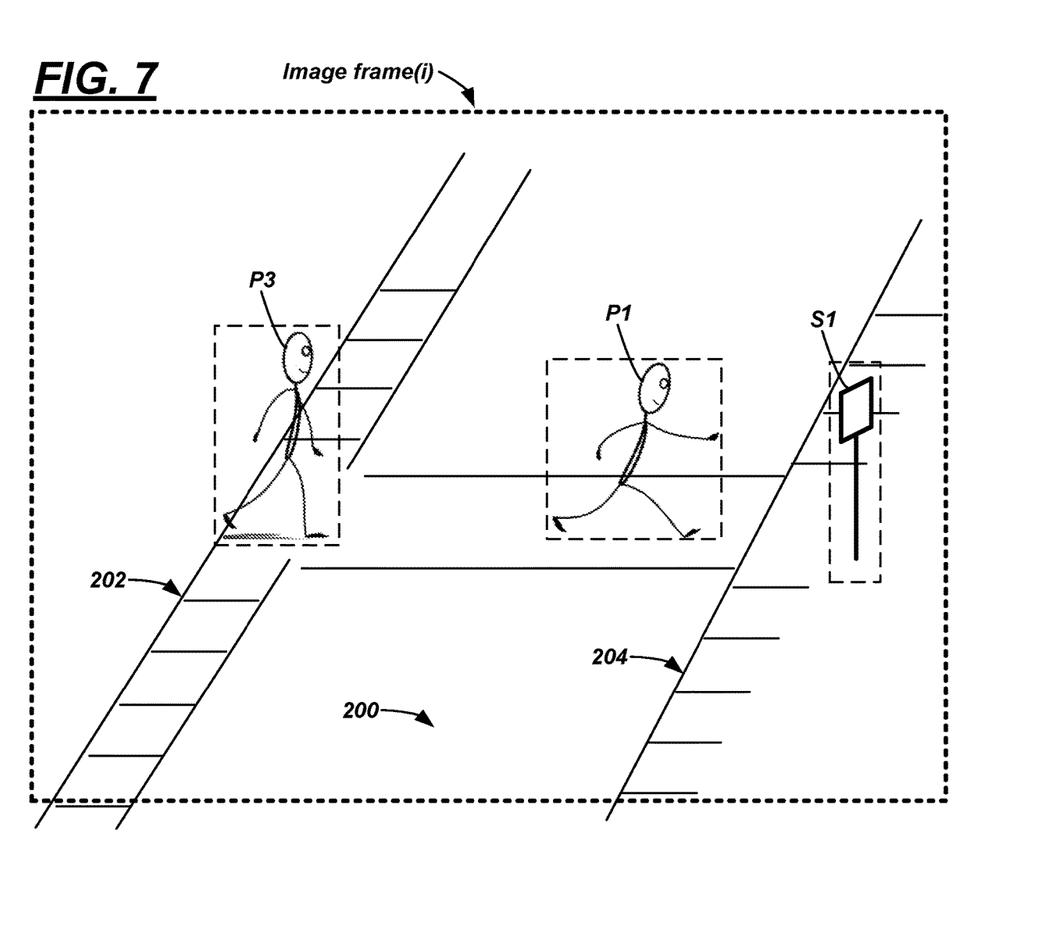
FIG. 7 is a schematic diagram illustrating an example of an image frame that includes a one or more objects of interest to an operator of a vehicle.

Turning to FIG. 7, an example of an image frame(i) captured by eye-tracking system 14 is shown. FIG. 7 illustrates a roadway 200, a sidewalk 202 on one side of roadway 200, a sidewalk 204 on an opposite side of roadway 200, and a plurality of pedestrians P1 and P2 all of which are within a field of view of sensor 22. As shown, the image frame(i) can also include a sign S1. In the example image frame(i), pedestrian P1 is walking within (and across) roadway 100 and pedestrian P2 is initiating walking into roadway 100 from sidewalk 102.

Using the example image frame(i) illustrated in FIG. 7, the eye-tracking system 14 tracks the eye gaze of the user. The eye-tracking system 14 provides the image frame(i) and the corresponding eye gaze data to the deep neural network 80. As discussed above, the deep neural network 80 generates region proposals for classification and regression purposes based on the eye gaze data. For instance, if the eye gaze of the user is focused on P1, the deep neural network 80 may generate a region proposal about P1 for classification and regression purposes.

Figure 8:
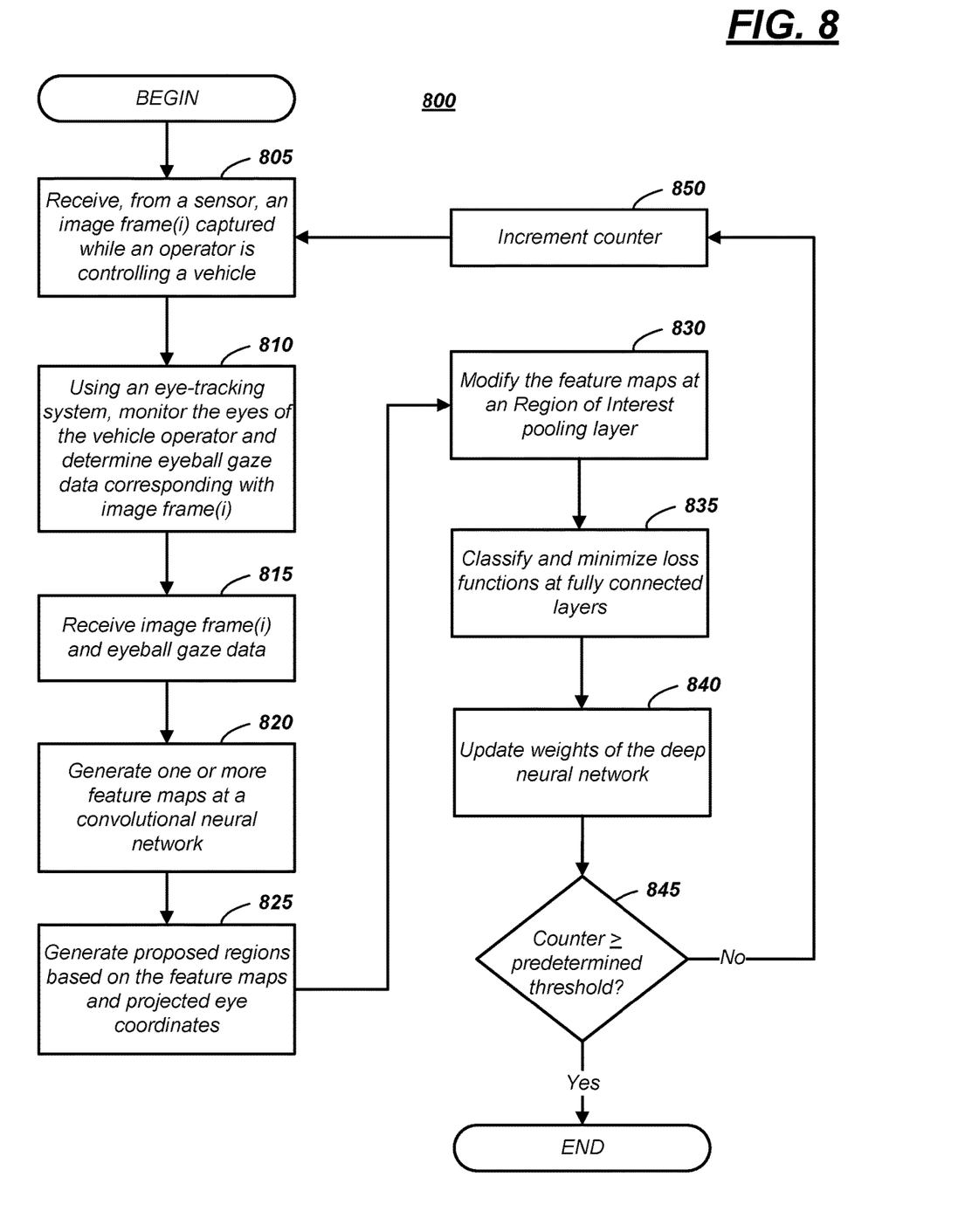
FIG. 8 is a flow diagram illustrating a process of training the deep neural network to determine one or more target objects.

FIG. 8 illustrates an example flow diagram illustrating an example process 800 for driver priority based object detection. The process 800 comprises software instructions executable by computer 18 (e.g., executable by the one or more processors 40 stored in memory 42). Non-limiting examples of software instructions are illustrated as instructional blocks in the diagram. It will be appreciated that while not necessarily explained explicitly in process 800, other software instructions may be carried out as well.

Process 800 may begin at block 805, wherein computer 18 receives (from sensor 22) at least one image frame(i) captured by sensor 22 while an operator, e.g., user, is controlling the vehicle 12. In at least one example, the operator is wearing the eye-tracking system 14, and the sensor 22 comprises part of the system 14 (e.g., carried by eyeglasses frames or the like). More particularly, according to one example, computer 28 (of eye-tracking system 14) first receives the frame(i) and—in addition to using the frame(i) in tracking the operator's eye movement—computer 28 provides the frame(i) to computer 18. Not intending to be limiting but instead to illustrate process 800, consider the current image frame(i) of block 805 to be similar to that shown in FIG. 7. Thus, while the sensor 22 is capturing image frames(i), the operator is controlling the vehicle 12 by steering, braking, and/or accelerating the vehicle 12 while driving down roadway 100.

In block 810 which follows, the eye-tracking system 14 monitors the eyes of the operator and determines eyeball gaze data that corresponds with image frame(i). As described above, determining eyeball gaze data may include the eye-tracking system 14 gathering multiple criteria by monitoring the operator's eyes using the camera(s) 24 and illuminator(s) 26 while the sensor 22 captures images of the scene forward-looking from the operator's perspective. Furthermore, the eyeball gaze data may include a correlation, e.g., time stamps, of the operator's eye criteria with the respective image frame(i). The eyeball gaze data may comprise at least some of the criteria cited in the non-exhaustive list of examples set forth above.

In block 815, the computer 18 receives the image frame(i) and the eyeball gaze data from the eye-tracking system 14. The computer 18 may use suitable mapping techniques to map the eyeball gaze data to feature map coordinates, i.e., the projected eye coordinates. In block 820, the convolutional neural network 90 generates one or more feature maps corresponding to the image frame(i). At block 825, the region proposal network 92 generates proposed regions based on the feature maps generated by the convolutional neural network 90 and the projected eye coordinates 91. As discussed above, the proposed regions may correspond to objects of interest. At block 830, the ROI pooling layer 94 modifies the feature maps such that each the feature maps are the same size, e.g., a predetermined size. At block 835, the fully connected layers 96, 98 classify objects within the proposed regions and minimize loss functions based on regression techniques. For example, the computer 18 may compare the proposed regions and/or classifications with ground truth data. The ground truth data may be defined (in part) by the operator looking at a 3D gaze point for a threshold amount of time ($THR_{time1}$) (wherein the 3D gaze point corresponds with an object of interest in the image frame(i)), a pupil size larger than a threshold ($THR_{pupil}$) while the operator views a 3D gaze point for a second threshold amount of time ($THR_{time2}$), or the like). Additionally or alternatively, the ground truth data may include defined regions about the object of interest. The computer 18 can also compare the defined regions of the ground truth data to the proposed regions.

At block 840, one or more weights of the deep neural network are updated based on the comparisons to the ground truth data. For example, the computer 18 updates the weights of the deep neural network 80 based on the comparisons.

At block 845, a determination is made whether counter i is greater than or equal to a predetermined threshold. The predetermined threshold may be defined as a number of epochs to train the deep neural network 80. If the counter i is not greater than or equal to the predetermined threshold, the counter i the counter is incremented (e.g., i=i+1) at block 850 and then loops to block 805. Otherwise, the process 800 ends.

Figure 9:
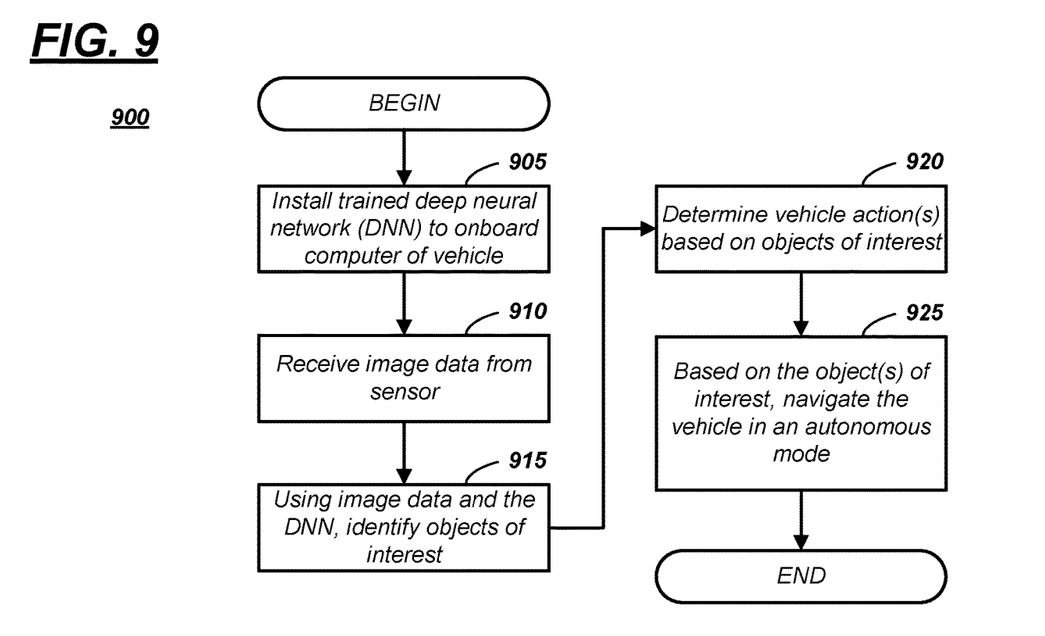
FIG. 9 is a flow diagram illustrating a process of using the trained deep neural network.

FIG. 9 is flow diagram(s) illustrating a process 900 of using the deep neural network 80 trained in process 800. The process 900 comprises software instructions executable by an onboard vehicle computer 18. Non-limiting examples of software instructions are illustrated as instructional blocks in the diagram. It will be appreciated that while not necessarily explained explicitly in process 900, other software instructions may be carried out as well.

Process 900 may begin with block 905, wherein the deep neural network 80 is installed in the onboard computer 18 of vehicle 12. Computer 18 may be embedded in a vehicle, similar to vehicle 12, and the vehicle may be a sellable unit (e.g., sold by a vehicle manufacturer to an end user/customer).

In block 910, image data may be received at computer 18 via a sensor mounted in vehicle. Sensor may be similar to sensor 22, except that it is not part of the eye-tracking system 14 (e.g., no eye-tracking system 14 is required in vehicle having the trained deep neural network). Instead, sensor is used by vehicle for navigation and/or other autonomous driving tasks.

In block 915 which follows, target objects may be identified, e.g., classified, using the image data and the trained deep neural network 80. In block 920, the computer 18 may determine a vehicle action based on the classified object. For example, the computer 18 may calculate the trajectories of the target objects. In at least one example, trajectories are calculated only for objects classified by the output of deep neural network 80. As fewer trajectories may be calculated, the computational burden placed on computer 18 is minimized. In block 925, based on the objects, vehicle 12 is navigated in a partially or fully autonomous mode.

Thus, there has been described a training system and a technique for using the training system to train a deep neural network to determine target objects while an operator is controlling a vehicle. The training system may comprise an eye-tracking system and one or more deep neural networks. Moreover, data from the eye-tracking system is used to execute the training.

In general, the computing systems and/or devices described may employ any of a number of computer operating systems, including, but by no means limited to, versions and/or varieties of the AppLink/Smart Device Link middleware, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, Python, etc. Some of these applications may be compiled and executed on a computing machine, such as the so-called Java Virtual Machine, the so-called Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Where databases, data repositories or other data stores are described herein, these may include various kinds of mechanisms for storing, accessing, and retrieving various kinds of data, including a hierarchical database, a set of files in a file system, an application database in a proprietary format, a database management system (DBMS), etc. Each such data store is generally included within a computing device employing a computer operating system such as one of those mentioned above and are accessed via a network in any one or more of a variety of manners. A file system may be accessible from a computer operating system and may include files stored in various formats. A DBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., wearable devices, servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method of training a deep neural network, comprising:
receiving, from an eye-tracking system associated with a sensor, an image frame captured while an operator is controlling a vehicle;
receiving, from the eye-tracking system, eyeball gaze data corresponding to an object of interest depicted within the image frame; and
iteratively training the deep neural network to determine the object of interest depicted within the image frame based on the eyeball gaze data, wherein the deep neural network generates at least one feature map, wherein the at least one feature map includes one or more bounding boxes and the deep neural network determines a proposed region corresponding to the object of interest within the at least one feature map based on:
the eyeball gaze data; and
at least one of the one or more bounding boxes;
wherein training the deep neural network to determine the object of interest includes comparing the proposed region with ground truth data, the ground truth data at least partly defined as the object of interest by the operator looking at a 3D gaze point located on the object of interest for a threshold amount of time according to the eyeball gaze data.

2. The method of claim 1, wherein the eye-tracking system is a wearable eye-tracking system and is worn by the operator while the image frame is captured by the sensor.

3. The method of claim 1, wherein the deep neural network comprises a convolutional neural network (CNN), wherein an input to the CNN is the image frame, wherein an output of the CNN comprises the at least one feature map.

4. The method of claim 3, wherein the deep neural network comprises a region proposal network that receives the at least one feature map and projected eye coordinates corresponding to the eyeball gaze data, wherein the region proposal network determines the proposed region based on the projected eye coordinates.

5. The method of claim 4, wherein the deep neural network comprises a region of interest pooling layer that receives the at least one feature map and the proposed region, wherein the region of interest pooling layer modifies the at least one feature map such that a size of modified feature map equals a predetermined size.

6. The method of claim 5, wherein the deep neural network comprises at least one fully connected layer that receives the modified feature map, wherein the at least one fully connected layer classifies the object of interest.

7. The method of claim 1, wherein the eye-tracking system comprises the sensor, one or more illuminators directed toward the operator's eyes, one or more cameras directed toward the operator's eyes, and a computer programmed to use the eyeball gaze data and the image frame to determine the 3D gaze point of the operator, wherein the sensor comprises a red-green-blue (RGB) camera.

8. The method of claim 1, further comprising: installing the trained deep neural network in a vehicle; and using the trained deep neural network to navigate the vehicle in an autonomous mode, wherein, when used to navigate the vehicle, the deep neural network determines the object of interest without using eyeball gaze data.

9. The method of claim 1, wherein the sensor is directed away from the operator toward a field of view of the operator.

10. A system, comprising:
an eye-tracking system including a sensor;
a computer communicatively coupled to the sensor and the eye-tracking system, the computer comprising one or more processors and memory storing instructions executable by the one or more processors, wherein the instructions, when executed by the processor, cause the processor to:
receive, from the eye-tracking system, an image frame captured while an operator is controlling a vehicle;
receive, from the eye-tracking system, eyeball gaze data corresponding to an object of interest depicted within the image frame; and
iteratively train a deep neural network to determine the object of interest depicted within the image frame based on the eyeball gaze data, wherein the deep neural network generates at least one feature map, wherein the at least one feature map includes one or more bounding boxes and the deep neural network determines a proposed region corresponding to the object of interest within the at least one feature map based on:
the eyeball gaze data; and
at least one of the one or more bounding boxes;
wherein training the deep neural network to determine the object of interest includes comparing the proposed region with ground truth data, the ground truth data at least partly defined as the object of interest by the operator looking at a 3D gaze point located on the object of interest for a threshold amount of time according to the eyeball gaze data.

11. The system of claim 10, wherein the eye-tracking system is a wearable eye-tracking system and is worn by the operator while the image frame is captured by the sensor.

12. The system of claim 10, wherein the deep neural network comprises a convolutional neural network (CNN), wherein an input to the CNN is the image frame, wherein an output of the CNN comprises the at least one feature map.

13. The system of claim 12, wherein the deep neural network comprises a region proposal network that receives the at least one feature map and projected eye coordinates corresponding to the eyeball gaze data, wherein the region proposal network determines the proposed region based on the projected eye coordinates.

14. The system of claim 13, wherein the deep neural network comprises a region of interest pooling layer that receives the at least one feature map and the proposed region, wherein the region of interest pooling layer modifies the at least one feature map such that a size of modified feature map equals a predetermined size.

15. The system of claim 14, wherein the deep neural network comprises at least one fully connected layer that receives the modified feature map, wherein the at least one fully connected layer classifies the object of interest.

16. The system of claim 10, wherein the eye-tracking system includes the sensor, one or more illuminators directed toward the operator's eyes, one or more cameras directed toward the operator's eyes, and a computer programmed to use the eyeball gaze data and the image frame to determine the 3D gaze point of the operator, wherein the sensor comprises a red-green-blue (RGB) camera.

17. The system of claim 10, wherein the instructions, when executed by the processor, cause the processor to: navigate the vehicle in an autonomous mode based on the object of interest, and wherein, when used to navigate the vehicle, the deep neural network determines the object of interest without using eyeball gaze data.

18. The system of claim 10, wherein the sensor is directed away from the operator toward a field of view of the operator.

* * * * *